United States Patent [19]
Sawada et al.

[11] Patent Number: 5,575,944
[45] Date of Patent: Nov. 19, 1996

[54] ACETAL-CONTAINING WORKING FLUID COMPOSITION FOR REFRIGERATING MACHINE

[75] Inventors: Hiroki Sawada; Hiroyasu Togashi, both of Wakayama, Japan

[73] Assignee: KAO Corporation, Tokyo, Japan

[21] Appl. No.: 395,827

[22] Filed: Feb. 28, 1995

[51] Int. Cl.$^6$ ............................ C09K 5/04; C10M 105/18
[52] U.S. Cl. ............................ 252/68; 252/67; 508/304; 508/459; 508/579
[58] Field of Search .................... 252/68, 67, 52 R, 252/56 R, 52 A; 549/372, 449

[56] References Cited

U.S. PATENT DOCUMENTS

| | | | |
|---|---|---|---|
| 2,636,884 | 4/1953 | Tenenbaum et al. | 549/449 |
| 3,741,986 | 6/1973 | Hartman | 549/372 |
| 3,900,411 | 8/1975 | Andress, Jr. et al. | 252/52 R |
| 3,910,845 | 10/1975 | Coon | 252/52 R |
| 4,076,727 | 2/1978 | Zey et al. | 549/372 |
| 4,755,316 | 7/1988 | Magio et al. | 252/68 |
| 4,851,144 | 7/1989 | McGraw et al. | 252/52 A |
| 4,866,141 | 9/1989 | Gutierrez et al. | 252/68 |
| 5,023,007 | 6/1991 | Grava et al. | 252/67 |
| 5,300,245 | 4/1994 | Sawada et al. | 252/68 |
| 5,395,544 | 3/1995 | Hagihara et al. | 252/68 |
| 5,401,433 | 3/1995 | Sawada et al. | 252/68 |

FOREIGN PATENT DOCUMENTS

| | | |
|---|---|---|
| 0019999 | 12/1980 | European Pat. Off. . |
| 0377122 | 7/1990 | European Pat. Off. . |
| 0406479 | 1/1991 | European Pat. Off. . |
| 0421298 | 4/1991 | European Pat. Off. . |
| 0452816 | 10/1991 | European Pat. Off. . |
| 2158693 | 6/1990 | Japan . |
| 3217495 | 9/1991 | Japan . |
| 4320498 | 11/1992 | Japan . |
| 6-57243 | 3/1994 | Japan . |
| 6-287586 | 10/1994 | Japan . |
| 2216541 | 10/1989 | United Kingdom . |

*Primary Examiner*—Christine Skane
*Attorney, Agent, or Firm*—Birch, Stewart, Kolasch & Birch, LLP

[57] ABSTRACT

The working fluid composition for refrigerating machine of the present invention includes a refrigeration oil and a hydrofluorocarbon, the refrigeration oil including a compound having one or more acetal groups in a molecule and also having trihydric to octahydric alcohol residues as a base oil.

12 Claims, No Drawings

ACETAL-CONTAINING WORKING FLUID COMPOSITION FOR REFRIGERATING MACHINE

BACKGROUND OF THE INVENTION

1. Field of the Invention

The present invention relates to a working fluid composition for refrigerating machine, and more specifically to a working fluid composition for a compression-type refrigerating machine used in electric refrigerators, air conditioners, etc.

2. Discussion of the Related Art

Recently, the use of dichlorodifluoromethane (CFC12) for refrigerators and car air conditioners is to be legally banned in order to protect the ozone layer, and also the use of chlorodifluoromethane (HCFC22) for room air conditioners is about to be legally regulated. Thus, hydrofluorocarbons which do not destroy the ozone layer, such as difluoromethane (HFC32), have been developed as substitutes for HCFC22.

However, since the polarity of hydrofluorocarbons is higher than that of CFC12, the use of conventional lubricating oils, such as naphthenic mineral oils, poly-α-olefins, or alkylbenzenes, causes two-layer separation of the working fluid at low temperatures. This is due to poor compatibility between the conventional lubricating oils and hydrofluorocarbons. Two-layer separation hampers oil return, which in turn interferes with heat transfer due to deposition of a thick oil film around the condenser and evaporator used as heat exchangers. It can also cause important failures such as poor lubrication, and foaming upon starting operation. Therefore, the conventional refrigeration oils cannot be used as refrigeration oils under these new refrigerant atmospheres.

As for lubricity, CFC12 generates hydrogen chloride upon its partial decomposition. The hydrogen chloride thus formed reacts with the friction surface to form a coating of chlorides, thereby the lubricity being improved. On the other hand, hydrofluorocarbons containing no chlorine atoms are not expected to have such an effect; therefore, the refrigeration oils used in combination with hydrofluorocarbons are required to have a further excellent lubricity when compared to the conventional refrigeration oils.

In addition, the refrigeration oils used in combination with hydrofluorocarbons have to have good thermal stability in the presence of hydrofluorocarbons.

Moreover, in the compression-type refrigerating machines for electric refrigerators, since organic materials are used for motor components such as insulators and enameled wires, the working fluid comprising a hydrofluorocarbon and a refrigeration oil is required to have no adverse effects to these organic materials and also have a good insulating property.

Polyether compounds which can be used as refrigeration oils in combination with hydrofluorocarbons such as 1,1,1,2-tetrafluoroethane (HFC134a) are disclosed in U.S. Pat. No. 4,755,316, WO 90/05172, European Patent No. 377,122, and other publications. In addition, for instance, mixed oils of polyether oils with ester oils which can be used as refrigeration oils in combination with 1,1,1,2-tetrafluoroethane (HFC134a) are disclosed in U.S. Pat. No. 4,851,144 (corresponding to Japanese Patent Laid-Open No. 2-276894) and Japanese Patent Laid-Open No. 2-158693; ester oils are disclosed in G.B. Patent No. 2,216,541 and European Patent No. 406,479; and carbonate oils are disclosed in European Patent Nos. 421,298 and 452,816 and Japanese Patent Laid-Open No. 3-217495.

Since these compounds have a higher polarity than the naphthenic mineral oils, their compatibility with HFC134a at low temperatures is certainly good. Also, these compounds have good thermal stability in the presence of the hydrofluorocarbons. However, when compared with the CFC12-mineral oil system which is a conventional working fluid, both the hydrofluorocarbons and the oils have high polarity, so that they are likely to absorb water. Thus, these compounds lead to poor thermal stability in the presence of HFC134a and cause organic materials such as PET films to be hydrolyzed. Particularly in the case of using an ester oil, a carboxylic acid is likely to be formed, and the formed carboxylic acid may in turn corrode metals to wear down the metals. Also, in the case of using a carbonate oil, there arises such a problem that a non-condensable carbon dioxide gas is generated owing to hydrolysis of the carbonate oil.

Therefore, a method of adding an orthoester or acetal compound to a polyether oil or ester oil as a moisture-trapping agent has been proposed (see Japanese Patent Laid-Open No. 4-320498). However, the acetal compound derived from a monohydric or dihydric alcohol disclosed in this publication has an undesirably low molecular weight, low boiling point, and low flash point. Moreover, from the viewpoints of providing a viscosity necessary for a lubricating oil and having compatibility with hydrofluorocarbons, the amount to be added is restricted.

SUMMARY OF THE INVENTION

Accordingly, an object of the present invention is to provide a working fluid composition having excellent compatibility with hydrofluorocarbons, and exhibiting high stability in the acid value incurred by hydrolysis, thereby solving the above problems.

As a result of intense research in view of the above object, the present inventors have found that a refrigeration oil comprising a compound having one or more acetal groups in a molecule and also having trihydric to octahydric alcohol residues as a base oil can trap moisture without adding any additives, which results in only a small increase in the acid value and no generation of a non-condensable gas. The present invention is completed based upon this finding.

The present invention is concerned with a working fluid composition for refrigerating machine, comprising a refrigeration oil and a hydrofluorocarbon, the refrigeration oil comprising a compound having one or more acetal groups in a molecule and also having trihydric to octahydric alcohol residues as a base oil.

DETAILED DESCRIPTION OF THE INVENTION

The compounds used in the present invention have one or more acetal groups in a molecule and also have trihydric to octahydric alcohol residues. Examples of these compounds include cyclic acetals formed by treating diols in a molecule such as glycerol, diglycerol, triglycerol, tetraglycerol, pentaglycerol, hexaglycerol, trimethylolethane, trimethylolpropane, pentaerythritol, dipentaerythritol, tripentaerythritol, sorbitol, and sorbitan with a ketone such as acetone and methyl ethyl ketone, the cyclic acetals having alcohol residues. Examples of these compounds include the compounds represented by the general formula (I) and (II):

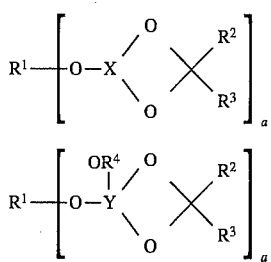

wherein X represents a polyol residue of glycerol, trimethylolethane, or trimethylolpropane; Y represents a polyol residue of pentaerythritol; $R^1$ represents a monovalent group or a divalent group, the monovalent group being selected from the group consisting of the groups represented by the general formula (III), and the divalent group being selected from the group consisting of the groups represented by the general formula (IV):

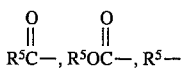

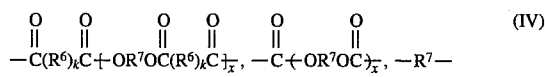

wherein $R^5$ represents a linear or branched alkyl group, aryl group, arylalkyl group, each having not more than 20 carbon atoms, or an oxyalkylene group represented by the general formula (V):

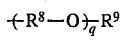

wherein $R^8$ represents a linear or branched alkylene group having 2–4 carbon atoms; $R^9$ represents a hydrogen atom, or a linear or branched alkyl group, aryl group, or arylalkyl group, each having not more than 20 carbon atoms; and q represents a number of 1–40;

$R^6$ represents a linear or branched alkylene group or arylene group, each having not more than 20 carbon atoms;

$R^7$ represents a linear or branched alkylene group, arylene group, each having not more than 20 carbon atoms, or an alkylene oxyalkylene group represented by the general formula (VI):

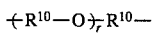

wherein $R^{10}$ represents a linear or branched alkylene group having 2–4 carbon atoms; and r represents a number of 1–40;

k represents a number of 0–1; and x represents a number of 0–40;

and wherein $R^2$ and $R^3$ independently represent a linear or branched alkyl group, aryl group, or arylalkyl group, each having not more than 20 carbon atoms; $R^4$ represents a hydrogen atom or a monovalent group selected from the group consisting of the groups represented by the general formula (III); "a" represents 1 in the case where $R^1$ is a monovalent group, or 2 in the case where $R^1$ is a divalent group; when "a" is 2, $R^2$, $R^3$, and $R^4$ may be identical or different from one another.

In the general formulas (I), (II), (III), and (V), examples of the alkyl groups, aryl groups, or arylalkyl groups represented by $R^2$, $R^3$, $R^5$, and $R^9$, each having not more than 20 carbon atoms, include linear alkyl groups such as a methyl group, an ethyl group, a propyl group, a butyl group, a pentyl group, a heptyl group, an octyl group, a nonyl group, a decyl group, an undecyl group, a lauryl group, a myristyl group, a palmityl group, and a stearyl group; branched alkyl groups such as an isopropyl group, an isobutyl group, an isoamyl group, a 2-ethylhexyl group, an isostearyl group, and a 2-heptylundecyl group; aryl groups such as a phenyl group and a methylphenyl group; and arylalkyl groups such as a benzyl group.

Examples of linear or branched alkylene groups or arylene groups, each having not more than 20 carbon atoms represented by $R^6$ in the general formula (IV) include alkylene groups such as a methylene group, an ethylene group, a propylene group, an ethylethylene group, an octylethylene group, a trimethylene group, a tetramethylene group; and arylene groups such as a phenylene group and a naphthylene group.

Examples of linear or branched alkylene groups or arylene groups, each having not more than 20 carbon atoms represented by $R^7$ in the general formula (IV) include alkylene groups such as an ethylene group, a propylene group, an ethylethylene group, an octylethylene group, a trimethylene group, a tetramethylene group, a 3-methylpentamethylene group; and arylene groups such as a phenylene group and a naphthylene group.

Examples of linear or branched alkylene groups having 2–4 carbon atoms represented by $R^8$ or $R^{10}$ in the general formula (V) or (VI) include an ethylene group, a propylene group, and an ethylethylene group.

$R^4$ in the general formula (II) represents a hydrogen atom or a monovalent group selected from the group consisting of the groups represented by the general formula (III).

q is a number of from 1 to 40; r is a number of from 1 to 40; k is a number of from 0 to 1; and x is a number of from 0 to 40. "a" represents 1 in the case where $R^1$ is a monovalent group, or 2 in the case where $R^1$ is a divalent group. Incidentally, since q, r, k, and x all express average values, they are not limited to integers.

In addition, when "a" is 2, $R^2$, $R^3$, and $R^4$ may be identical or different from one another.

Examples of the compounds represented by the general formulas (I) and (II) include various compounds without limitation, including glycerol monoacetal derivatives such as 4-acetoxymethyl-2,2-diethyl-1,3-dioxolane, 4-(2-ethylhexanoyloxymethyl)-2,2-dimethyl-1,3-dioxolane, 4-ethoxycarbonyloxymethyl-2,2-dimethyl-1,3-dioxolane, 4-propoxymethyl-2,2-dimethyl-1,3-dioxolane, 4-hydroxymethyl-2-ethyl-2-methyl-1,3-dioxolane, POE(4)4-hydroxymethyl-2-ethyl-2-methyl-1,3-dioxolane, and POE(4)4-hydroxymethyl-2-ethyl-2-methyl-1,3-dioxolane monobutyl ether; trimethylolpropane monoacetal derivatives such as 5-hexanoyloxymethyl-2,2-dimethyl-5-ethyl-1,3-dioxane, 5-propoxycarbonyloxymethyl-2,5-diethyl-2-methyl-1,3-dioxane, and 5-butoxymethyl-2-methyl-2-propyl-5-ethyl-1,3-dioxane; and glycerol diacetal derivatives such as adipic acid diester of 4-hydroxymethyl-2,2-dimethyl-1,3-dioxolane or carbonic acid diester of 4-hydroxymethyl-2,2-dimethyl-1,3-dioxolane.

Among them, a preference is given to 4-(2-ethylhexanoyloxymethyl)-2,2-dimethyl-1,3-dioxolane, POE(4)4-hydroxymethyl-2-ethyl-2-methyl-1,3-dioxolane monobutyl ether, adipic acid diester of 4-hydroxymethyl-2,2-dimethyl-1,3-dioxolane, and carbonic acid diester of 4-hydroxymethyl-2,2-dimethyl-1,3-dioxolane.

Also, the above compounds may be used alone or in combination.

The compounds in the present invention having one or more acetal groups in a molecule specifically refer to those compounds having one to four acetal groups in a molecule, preferably two or three acetal groups in a molecule.

The above compounds can be obtained by any known methods. For instance, an ester acetal may be produced by a reaction of a hydroxyacetal with a carboxylic acid anhydride, an acid halide, or an ester. In the case of the reaction of the hydroxyacetal with an acid halide, amines are used as hydrogen halide trapping agents. In the case of the reaction of the hydroxyacetal with an ester, an alkali metal or an alkali metal salt of a lower alcohol is usually used as a catalyst.

A carbonate acetal can be produced by the reaction of a hydroxyacetal with a carbonic acid ester, a chloroformic acid ester, or phosgene in the presence of an alkali metal or an alkali metal salt of a lower alcohol.

An alkoxyacetal can be produced by the reaction of a hydroxyacetal with an alkali metal, such as metallic sodium, or an alkali metal salt of a lower alcohol, such as sodium methylate, followed by the reaction of the obtained product with an alkyl halide, sulfuric acid ester, or sulfonic acid ester. Alternatively, it may be produced by the steps of converting hydroxyl groups of hydroxylacetal into sulfonic acid esters and halides; and allowing to react the obtained products with an alcohol or an alkali metal salt thereof.

The hydroxyacetal used as the starting material for the production of the acetal derivatives mentioned above is produced by the condensation reaction between a polyol and a ketone in the presence of an acid catalyst such as hydrochloric acid, sulfuric acid, or paratoluenesulfonic acid.

The above compounds having one or more acetal groups in a molecule and also having trihydric to octahydric alcohol residues preferably have a viscosity at 100° C. of from 0.5 to 100 cSt, more preferably from 0.5 to 30 cSt. When the viscosity at 100° C. exceeds 100 cSt, compatibility of the above compounds with the hydrofluorocarbon becomes poor. Also, the above compounds have a viscosity at 40° C. of preferably from 1 to 10,000 cSt, more preferably from 1 to 1,000 cSt. Among the compounds having a viscosity at 100° C. of from 0.5 to 100 cSt, a preference is given to the compounds having a low two-layer separation temperature between the compounds and the hydrofluorocarbons, specifically those having a two-layer separation temperature of not more than 0° C., more preferably not more than −10° C.

The refrigeration oil comprising a compound having one or more acetal groups in a molecule and also having trihydric to octahydric alcohol residues as a base oil used in the present invention can be mixed with mineral oils or synthetic oils such as poly α-olefins, alkylbenzenes, esters, polyethers, perfluoropolyethers, and phosphoric acid esters, in an amount so as not to impair compatibility with hydrofluorocarbons.

To the refrigeration oil comprising a compound having one or more acetal groups in a molecule and also having trihydric to octahydric alcohol residues as a base oil used in the present invention, for the purpose of improving lubricity, wear preventives such as triaryl phosphate, triaryl phosphite, trialkyl phosphate, trialkyl phosphite, zinc alkyldithiophosphate, zinc aryldithiophosphate, molybdenum dithiophosphate, molybdenum dithiocarbamate, and the like, or compounds having two hydroxyl groups at adjacent positions such as tartrate, glyceryl ether, glyceryl ester, and the like may be optionally added. Also, for the purpose of improving thermal stability, phenolic compounds or aromatic amine compounds having a radical trapping capacity may be optionally added to it.

To the refrigeration oil comprising a compound having one or more acetal groups in a molecule and also having trihydric to octahydric alcohol residues as a base oil used in the present invention, for the purpose of trapping the acid in the composition or for the purpose of even more effectively trapping water in the composition, additives such as an epoxide, an orthoester, and an acetal may be optionally added.

The wear preventive used as an additive in the present invention has 3–70 carbon atoms, and the amount of the wear preventive added is from 0.1 to 5.0 parts by weight, based on 100 parts by weight of the base oil. Also, the compound having two hydroxyl groups at adjacent positions used as an additive has 6–75 carbon atoms, and the amount of the compounds having two hydroxyl groups at adjacent positions added is from 0.01 to 100 parts by weight, based on 100 parts by weight of the base oil. Also, the phenolic compound or aromatic amine compound used as an additive has a radical trapping capacity and has 6–100 carbon atoms. The amount of the phenolic compound or aromatic amine compound added is from 0.05 to 2.0 parts by weight, based on 100 parts by weight of the base oil.

Examples of the epoxides used as additives include glycidyl ether compounds or alicyclic epoxy compounds, with a particular preference given to a compound having an epoxycyclohexyl group and a compound having an epoxycyclopentyl group. The epoxide used as an additive has 5–60 carbon atoms, preferably 5–40 carbon atoms. The amount of the epoxide added is from 0.05 to 5.0 parts by weight, preferably from 0.05 to 2.0 parts by weight, based on 100 parts by weight of the base oil used in the present invention. The orthoester or acetal used as an additive has 3–75 carbon atoms, and the amount of the orthoester or acetal added is from 0.01 to 30 parts by weight, based on 100 parts by weight of the base oil.

The working fluid composition for refrigerating machine of the present invention which comprises a hydrofluorocarbon and a refrigeration oil comprising a compound having one or more acetal groups in a molecule and also having trihydric to octahydric alcohol residues as a base oil or the refrigeration oil optionally added with the additives has a mixing ratio (hydrofluorocarbon/oil) normally of 50/1 to 1/20 (weight ratio), preferably 10/1 to 1/5 (weight ratio).

The hydrofluorocarbons used in the present invention include difluoromethane (HFC32), 1,1-difluoroethane (HFC152a), 1,1,1-trifluoroethane (HFC143a), 1,1,1,2-tetrafluoroethane (HFC134a), 1,1,2,2-tetrafluoroethane (HFC134) and pentafluoroethane (HFC125), with a particular preference given to 1,1,1,2-tetrafluoroethane, difluoromethane, and pentafluoroethane.

Since the working fluid composition for refrigerating machine of the present invention comprises a compound having one or more acetal groups in a molecule and also having trihydric to octahydric alcohol residues as a base oil, the resulting composition has excellent compatibility with the hydrofluorocarbon and high stability in the acid value incurred by hydrolysis.

Accordingly, the working fluid composition of the present invention can be used in a refrigeration cycle for various compression refrigerating machines. Also, the present invention provides a process of refrigeration comprising subjecting a working fluid to a refrigeration cycle, and an improved process of refrigeration can be achieved by utilizing the working fluid.

EXAMPLES

The present invention will be further described by means of Production Examples and Examples, without intending to restrict the scope of the present invention thereto.

Production Example 1

In a one-liter four-necked flask equipped with a stirrer, a distillation column, a thermometer, and a nitrogen inlet tube, 208.1 g (1.57 mol) of 4-hydroxymethyl-2,2-dimethyl-1,3-dioxolane (manufactured by Tokyo Chemical Industry Co., Ltd.), 67.5 g (0.75 mol) of dimethyl carbonate, and 1.13 g (0.00586 mol) of 28% (by weight) sodium methylate methanol solution are placed and heated at 85° C. for 3 hours and at 130° C. for 3 hours, while distilling off low-boiling point substances formed. After the product is cooled, 2.5 g of an alkali adsorbent ("KYOWADO 600," manufactured by Kyowa Chemical Industry Co., Ltd.) is added, and the mixture is stirred for one hour, and the reaction product is filtered. The filtrate is subject to a reduced-pressure distillation to give an oil 1 used for the present invention. The chemical structure of the obtained oil is identified to be that shown in Table 1 by $^1$H-NMR, $^{13}$C-NMR, and IR analyses (The same identification tests are conducted for Production Examples 2 to 5.).

Production Example 2

In a one-liter four-necked flask equipped with a magnetic stirrer, a distillation column, a thermometer, and a nitrogen inlet tube, 90.0 g (0.31 mol) of oil 1, 17.4 g (0.15 mol) of 3-methyl-1,5-pentanediol, and 1.14 g (0.0059 mol) of 28% (by weight) sodium methylate methanol solution are placed and heated at 110° C./1 mmHg for one hour while distilling off low-boiling point substances formed. After the product is cooled, 1.7 g of an alkali adsorbent ("KYOWADO 600") is added, and the mixture is stirred for one hour, and the reaction product is filtered to give an oil 2 used for the present invention. Also, as a result of GPC analysis, it is found that an average degree of polymerization is 1.1.

Production Example 3

In a two-liter four-necked flask equipped with a stirrer, a thermometer, and a dehydrating column with a condenser, 100.6 g (1.09 mol) of glycerol, 278.4 g (1.64 mol) of 6-undecanone, 3.0 g (0.0158 mol) of paratoluenesulfonic acid monohydrate, and 500 ml of hexane are placed. The reaction mixture is refluxed for 24 hours and water formed in the course of the reaction is removed from the flask.

After the reaction product is neutralized with a sodium hydroxide aqueous solution, and the mixture is subject to distillation under a reduced pressure to give 4-hydroxymethyl-2,2-dipentyl-1,3-dioxolane.

Next, in a one-liter four-necked flask equipped with a stirrer, a distillation column, a thermometer, and a nitrogen inlet tube, 100.0 g (0.41 mol) of 4-hydroxymethyl-2,2-dipentyl-1,3-dioxolane obtained above, 221.3 g (2.46 mol) of dimethyl carbonate, and 1.58 g (0.0082 mol) of 28% (by weight) sodium methylate methanol solution are placed and heated at 85° C. for one hour and at 130° C. for one hour, while distilling off low-boiling point substances. After the product is cooled, 2.3 g of an alkali adsorbent ("KYOWADO 600") is added, and the mixture is stirred for one hour, and the reaction product is filtered to give an oil 3 used for the present invention. As a result of gas chromatography analysis, it is found that the proportion of the monoacetals of the carbonate to the diacetals is 78/22 as determined by peak area ratio.

Production Example 4

In a one-liter four-necked flask equipped with a stirrer, a distillation column, a thermometer, and a nitrogen inlet tube, 175.7 g (1.32 mol) of 4-hydroxymethyl-2,2-dimethyl-1,3-dioxolane, 96.1 g (0.6 mol) of dimethyl glutarate, and 10.2 g (0.053 mol) of 28% (by weight) sodium methylate methanol solution are placed and heated at 130° C. for one hour and at 150° C. for 2 hours, while distilling off low-boiling point substances formed. After the product is cooled, 14.8 g of an alkali adsorbent ("KYOWADO 600") and 200 ml of diethylether are added, and the mixture is stirred for one hour, and the reaction product is filtered. After the solvent is removed, the product is subject to a vacuum distillation to give 27 g of an oil 4 used for the present invention having a boiling point of 125° C./0.40 mmHg. Further, the distillation residue is filtered to give an oil 5 used for the present invention.

Production Example 5

The same procedures as in Production Example 3 are carried out except that glycerol is replaced with 292.1 g (2.18 mol) of trimethylolpropane, 6-undecanone is replaced with 474.0 g (8.17 mol) of acetone, and the amount of paratoluenesulfonic acid monohydrate is changed to 6.0 g (0.0315 mol) and the amount of hexane is changed to 900 ml to give 5-hydroxymethyl-5-ethyl-2,2-dimethyl-1,3-dioxane.

Next, in a 500 ml-stainless steel autoclave equipped with a stirrer, a liquid leading pipe, an exhaust gas pipe, and a thermometer, 17.4 g (0.1 mol) of 5-hydroxymethyl-5-ethyl-2,2-dimethyl-1,3-dioxane obtained above, 0.19 g (0.001 mol) of 28% (by weight) sodium methylate methanol solution, and 5 ml of toluene are placed and heated at 110° C., while gradually reducing the pressure from normal pressure to a reduced pressure (0.4 mmHg) in a period of one hour to remove low-boiling point substances from the exhaust gas pipe. After tightly sealing the autoclave, 58.0 g (1.0 mol) of propylene oxide is introduced at 110° C. into the autoclave under pressure through the liquid leading pipe over a period of 8 hours. After the reaction mixture is cooled, 21.2 g (0.11 mol) of 28% (by weight) sodium methylate methanol solution and 150 ml of toluene are added to the above reaction mixture, and the obtained mixture is heated at 110° C., while gradually reducing the pressure from normal pressure to a reduced pressure (0.4 mmHg) in a period of 2 hours to remove low-boiling point substances from the exhaust gas pipe.

After the product is cooled, 15.6 g (0.11 mol) of methyl iodide is added, and the autoclave is tightly sealed and heated at 60° C. for 3 hours and further heated at 90° C. for 5 hours. After the product is cooled, 2.8 g of an alkali adsorbent ("KYOWADO 600") is added, and the mixture is stirred for one hour, and the reaction product is filtered to give an oil 6 used for the present invention.

Production Example 6

In a three-liter four-necked flask equipped with a stirrer, a thermometer, a nitrogen inlet tube, and a dehydrating column with a condenser, 336.8 g (1.85 mol) of D-sorbitol, 800.0 g (11.1 mol) of methyl ethyl ketone, 17.6 g (0.092 mol) of paratoluenesulfonic acid monohydrate, and 200 ml of hexane are placed and heated at a temperature between 69° and 79° C. at a normal pressure in a nitrogen gas atmosphere for 8 hours while distilling off water. After the reaction is completed, the reaction mixture is cooled to 60°

C., and 19.6 g (0.185 mol, which is two equivalents to paratoluenesulfonic acid) of sodium carbonate is added to the above reaction mixture to neutralize the mixture, and the mixture is stirred at 60° C. for 30 minutes. After 200 g of water is added, the mixture is stirred for 30 minutes and then kept standing to allow the separation of oily and aqueous layers. After the lower layer is removed, the upper layer is washed with 200 g of a saturated saline solution. Thereafter, hexane and excess methyl ethyl ketone are removed under a reduced pressure by a rotary evaporator. Further, the obtained residue is subject to a reduced-pressure distillation to give an oil having a hydroxyl value of 12.9 mg KOH/g. Further, a part of this oil is purified by column chromatography to give an oil 7 used for the present invention having a hydroxyl value of 0.0 mg KOH/g.

Example 1

Each of inventive products 1 through 7 and comparative products 1 and 2 is prepared, each comprising 1,1,1,2-tetrafluoroethane (HFC134a) and one of the oils 1, 2, 3, 4, 5, 6, 7 for the present invention, comparative oils 1, and 2 shown in Table 1, to evaluate compatibility between the hydrofluorocarbon and the oil. Specifically, the two-phase separation temperature for 1,1,1,2-tetrafluoroethane at low temperatures is measured at a sample oil concentration of 10 vol %. The results are shown in Table 1 together with the viscosity of each oil. As is evident from Table 1, the inventive products surpass the comparative products in compatibility.

TABLE 1

| Compounds | Viscosity (cSt) at 40° C. | Viscosity (cSt) at 100° C. | Low-Separation Temperature (°C.) HFC 134a | Low-Separation Temperature (°C.) HFC 32 | Acid Value (mgKOH/g) Measured by Sealed Tube Test Before Test | Acid Value (mgKOH/g) Measured by Sealed Tube Test After Test |
|---|---|---|---|---|---|---|
| Oil 1 for Inventive Product | 25.8 | 3.6 | <-70 | <0 | <0.05 | <0.05 |
| Oil 2 for Inventive Product | 100.0 | 9.5 | <-70 | <0 | <0.05 | <0.05 |
| Oil 3 for Inventive Product | 15.8 | 1.9 | -43 | <0 | <0.05 | <0.05 |
| Oil 4 for Inventive Product | 8.3 | 2.2 | <-70 | <0 | <0.05 | <0.05 |
| Oil 5 for Inventive Product | 23.4 | 4.1 | <-70 | <0 | <0.05 | <0.05 |
| Oil 6 for Inventive Product | 24.5 | 5.5 | <-70 | — | <0.05 | <0.05 |
| Oil 7 for | 63.1 | 4.54 | <-70 | — | <0.03 | <0.03 |

Peak Area Ratio (78/22) Measured by Gas Chromatography

Cyclic acetal compound formed by

TABLE 1-continued

| | Compounds | Viscosity (cSt) | | Low-Separation Temperature (°C.) | | Acid Value (mgKOH/g) Measured by Sealed Tube Test | |
|---|---|---|---|---|---|---|---|
| | | at 40° C. | at 100° C. | HFC 134a | HFC 32 | Before Test | After Test |
| Inventive Product | treating D-sorbitol with methyl ethyl ketone | | | | | | |
| Oil 1 for Comparative Product | Naphthenic Oil | 30.0 | 4.4 | 20< | 0< | — | — |
| Oil 2 for Comparative Product | ![Trimethylolpropane tricaprylate structure] (Trimethylolpropane tricaprylate) | 17.0 | 4.0 | 8 | 0< | 0.05> | 7.3 |

Example 2

With respect to each of the present inventive products 1 through 7 and comparative product 2, a sealed tube test is conducted under the conditions shown below to evaluate the thermal stability when these products contain water.

Specifically, 10 g of an oil and 5 g of HFC134a are placed in a glass tube, and water is added at 3000 ppm relative to the oil. Iron, copper, and aluminum are added thereto as catalysts, and the glass tube is sealed. After testing at 175° C. for 14 days, the sealed tube is opened, and the acid value of oil after removing the hydrofluorocarbon is measured. The results are shown in Table 1.

As is evident from Table 1, none of the inventive products show an increase in the acid value as in comparative product 2.

Example 3

Each of inventive products 1 through 5 and comparative products 1 and 2 is prepared, each comprising difluoromethane (HFC32) and one of the oils 1, 2, 3, 4, 5 for the present invention, comparative oils 1, and 2 shown in Table 1, to evaluate compatibility between the hydrofluorocarbon and the oil. Specifically, the two-phase separation temperature for difluoromethane at low temperatures is measured at a sample oil concentration of 10 vol %. The results are shown in Table 1.

As is evident from Table 1, the inventive products surpass the comparative products in compatibility.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A working fluid composition for a refrigerating machine comprising a refrigeration oil and a hydrofluorocarbon, said refrigeration oil comprising as a base oil a major amount of a compound having one or more cyclic acetal groups in a molecule and also having trihydric to octahydric alcohol residues, wherein the compound is selected from the group consisting of the compounds represented by the general formula (I) and the compounds represented by the general formula (II):

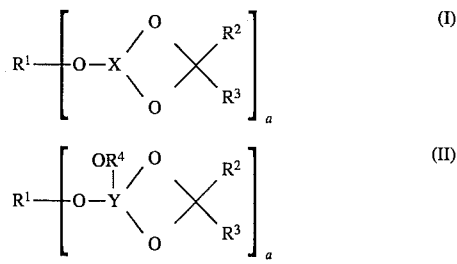

wherein X represents a polyol residue of glycerol, trimethylolethane, or trimethylolpropane, Y represents a polyol residue of pentaerythritol; $R^1$ represents a monovalent group or a divalent group, said monovalent group being selected from the groups represented by the general formula (III), and said divalent group being selected from the groups represented by the general formula (IV):

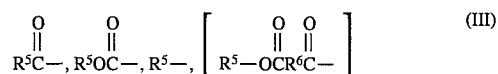

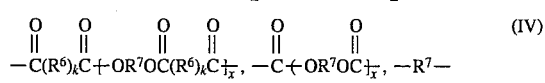

wherein $R^5$ represents a hydrogen atom, a linear or branched alkyl group, aryl group, arylalkyl group, each having not more than 20 carbon atoms, or an oxyalkylene group represented by the general formula (V):

wherein $R^8$ represents a linear or branched alkylene group having 2–4 carbon atoms; $R^9$ represents a hydrogen atom, or a linear or branched alkyl group, aryl group, or arylalkyl group, each having not more than 20 carbon atoms; and q represents a number of 1–40;

$R^6$ represents a linear or branched alkylene group or arylene group, each having not more than 20 carbon atoms;

$R^7$ represents a linear or branched alkylene group, arylene group, each having not more than 20 carbon atoms, or an alkylene oxyalkylene group represented by the general formula (VI):

wherein $R^{10}$ represents a linear or branched alkylene group having 2–4 carbon atoms; and r represents a number of 1–40;

k represents a number of 0–1; and x represents a number of 0–40; and wherein $R^2$ and $R^3$ independently represent a linear or branched alkyl group, aryl group, or arylalkyl group, each having not more than 20 carbon atoms; $R^4$ represents a hydrogen atom or a monovalent group selected from the group consisting of the groups represented by the general formula (III); "a" represents 1 in the case where $R^1$ is a monovalent group, or 2 in the case where $R^1$ is a divalent group; when "a" is 2, $R^2$, $R^3$, and $R^4$ may be identical or different from one another.

2. The working fluid composition for refrigerating machine according to claim 1, wherein said compound represented by the general formula (I) and (II) is selected from the group consisting of a glycerol monoacetal; a trimethylolpropane monoacetal; and a glycerol diacetal.

3. The working fluid composition for refrigerating machine according to claim 2, wherein said glycerol monoacetal is selected from the group consisting of 4-acetoxymethyl-2,2-diethyl-1,3-dioxolane, 4-(2-ethylhexanoyloxymethyl)-2,2-dimethyl-1,3-dioxolane, 4-ethoxycarbonyloxymethyl-2,2-dimethyl-1,3-dioxolane, 4-propoxymethyl-2,2-dimethyl-1,3-dioxolane, 4-hydroxymethyl-2-ethyl-2-methyl-1,3-dioxolane, POE(4)4-hydroxymethyl-2-ethyl-2-methyl-1,3-dioxolane, and POE(4)4-hydroxymethyl-2-ethyl-2-methyl-1,3-dioxolane monobutyl ether.

4. The working fluid composition for refrigerating machine according to claim 2, wherein said trimethylolpropane monoacetal is selected from the group consisting of 5-hexanoyloxymethyl-2,2-dimethyl-5-ethyl-1,3-dioxane, 5-propoxycarbonyloxymethyl-2,5-diethyl-2-methyl-1,3-dioxane, and 5-butoxymethyl-2-methyl-2-propyl-5-ethyl-1,3-dioxane.

5. The working fluid composition for refrigerating machine according to claim 2, wherein said glycerol diacetal is selected from the group consisting of adipic acid diester of 4-hydroxymethyl-2,2-dimethyl-1,3-dioxolane or carbonic acid diester of 4-hydroxymethyl-2,2-dimethyl-1,3-dioxolane.

6. The working fluid composition for refrigerating machine according to claim 1, wherein said hydrofluorocarbon is selected from the group consisting of difluoromethane (HFC32), 1,1-difluoroethane (HFC152a), 1,1,1-trifluoroethane (HFC143a), 1,1,1,2-tetrafluoroethane (HFC134a), 1,1,2,2-tetrafluoroethane (HFC134), and pentafluoroethane (HFC125).

7. The working fluid composition for refrigerating machine according to claim 6, wherein the mixing ratio by weight of the hydrofluorocarbon/refrigeration oil is from 50/1 to 1/20.

8. The working fluid composition for a refrigerating machine according to claim 1, wherein the compound having one or more cyclic acetal groups in a molecule and also having trihydric to octahydric alcohol residues has a viscosity at 100° C. of from 0.5 to 100 cSt.

9. The working fluid composition for a refrigerating machine according to claim 8, wherein the compound having one or more cyclic acetal groups in a molecule and also having trihydric to octahydric alcohol residues has a low two-layer separation temperature of not more than 0° C. between the compound and the hydrofluorocarbon.

10. A process of refrigeration comprising subjecting a working fluid to a refrigeration cycle, wherein the working fluid is the working fluid composition of claim 1.

11. In a process for refrigeration utilizing a working fluid that is subjected to repeated refrigeration cycles, the improvement for which comprises using the working fluid composition of claim 1 as the working fluid.

12. A working fluid composition for a refrigerating machine comprising a refrigeration oil and a hydrofluorocarbon, said refrigeration oil comprising as a base oil a major amount of (2,2,-dimethyl-1,3-dioxolan-4-yl)methyl glutarate.

* * * * *

UNITED STATES PATENT AND TRADEMARK OFFICE
CERTIFICATE OF CORRECTION

PATENT NO. : 5,575,944
DATED : Nov. 19, 1996
INVENTOR(S) : Sawada et al.

It is certified that error appears in the above-indentified patent and that said Letters Patent is hereby corrected as shown below:

Claim 1, column 16, line 1, delete 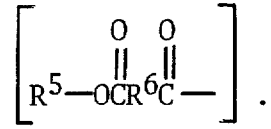 .

Signed and Sealed this

Twenty-sixth Day of August, 1997

Attest:

BRUCE LEHMAN

Attesting Officer         Commissioner of Patents and Trademarks